United States Patent
Serrano et al.

(10) Patent No.: US 7,539,091 B2
(45) Date of Patent: May 26, 2009

(54) DIFFERENTIAL PUSH-PULL GAIN CONTROLLING METHOD AND APPARATUS TO REDUCE THE EFFECTS OF ROTATIONAL ECCENTRICITY

(75) Inventors: Louis J. Serrano, Los Gatos, CA (US); Ting Zhou, Alameda, CA (US)

(73) Assignee: LSI Corporation, Milpitas, CA (US)

( * ) Notice: Subject to any disclaimer, the term of this patent is extended or adjusted under 35 U.S.C. 154(b) by 649 days.

(21) Appl. No.: 11/282,881

(22) Filed: Nov. 18, 2005

(65) Prior Publication Data
US 2007/0115792 A1 May 24, 2007

(51) Int. Cl.
*G11B 7/095* (2006.01)
(52) U.S. Cl. ............... 369/44.35; 369/44.29; 369/53.14
(58) Field of Classification Search ............... 369/44.27, 369/44.29, 44.35, 53.14, 124.06, 124.1–124.12
See application file for complete search history.

(56) References Cited

U.S. PATENT DOCUMENTS

| | | | | |
|---|---|---|---|---|
| 4,764,914 A | * | 8/1988 | Estes et al. ............... | 369/53.14 |
| 5,715,225 A | * | 2/1998 | Victora et al. ............... | 369/94 |
| 6,118,739 A | * | 9/2000 | Kishinami et al. ............... | 369/53.14 |
| 6,147,944 A | * | 11/2000 | Kwon et al. ............... | 369/44.29 |
| 2001/0019524 A1 | * | 9/2001 | Na ............... | 369/53.14 |
| 2004/0013056 A1 | * | 1/2004 | Ando ............... | 369/44.29 |

FOREIGN PATENT DOCUMENTS

JP  11353831 A  * 12/1999

* cited by examiner

*Primary Examiner*—Andrea L Wellington
*Assistant Examiner*—Nathan Danielsen
(74) *Attorney, Agent, or Firm*—Christopher P. Maiorana, PC

(57) ABSTRACT

An apparatus comprising a photo diode array, a differential push-pull generator circuit and an attenuation prediction circuit. The photo diode array may be configured to generate a plurality of beam signals. The differential push-pull generator circuit may be configured to generate a differential push-pull signal with one or more gain blocks in response to (i) a plurality of input signals, (ii) a gain approximation signal and (iii) the plurality of beam signals. The attenuation prediction circuit may be configured to (i) predict an attenuation factor of the differential push-pull signal and (ii) generate the gain approximation signal in response to (a) a plurality of amplification signals and (b) a plurality of angle signals.

20 Claims, 12 Drawing Sheets

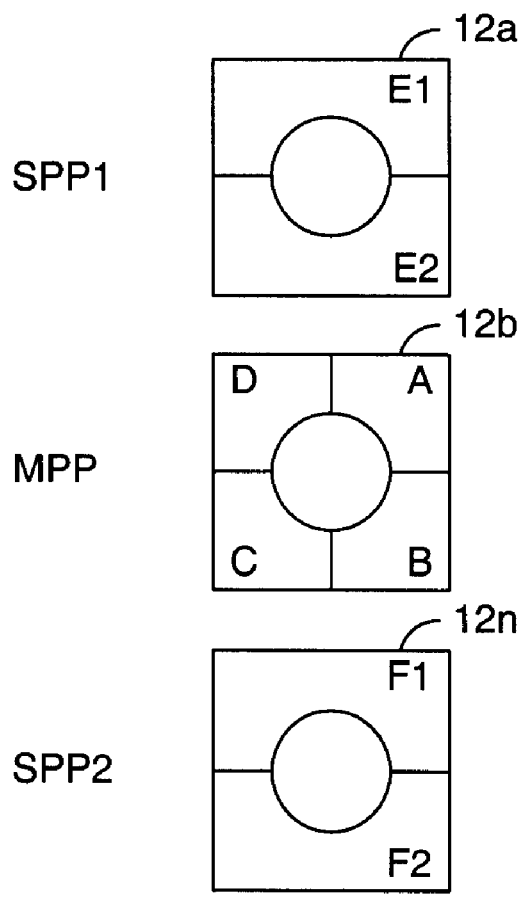
(CONVENTIONAL)
FIG. 1

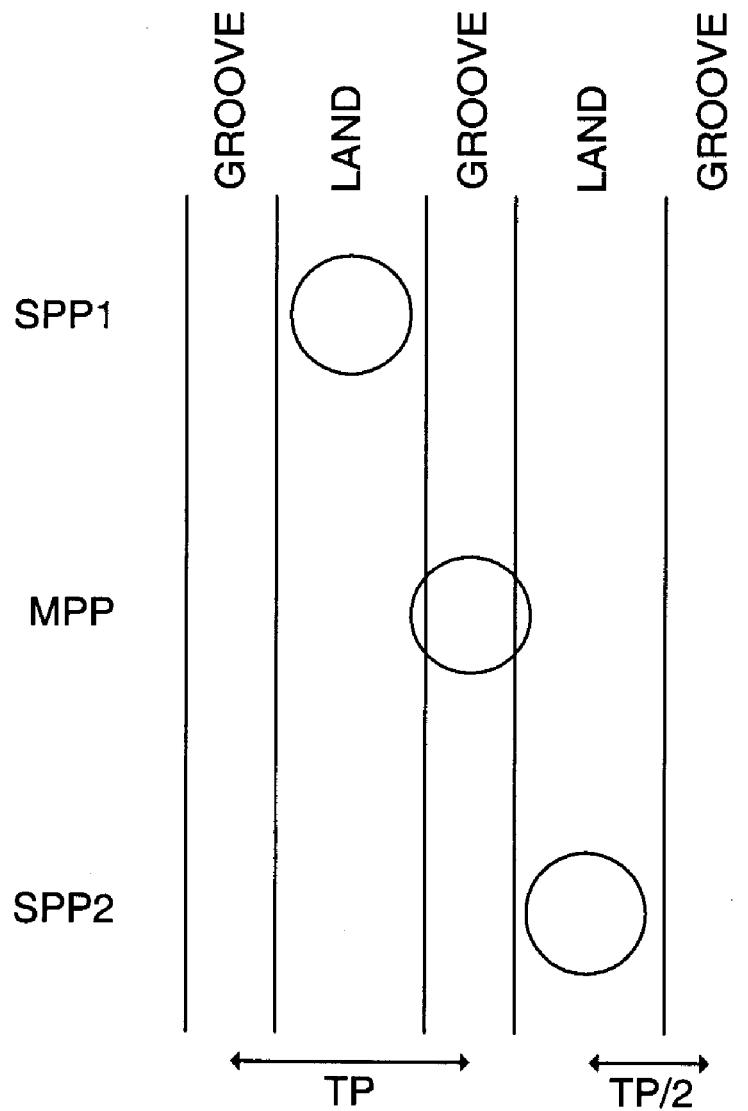
(CONVENTIONAL)
FIG. 2

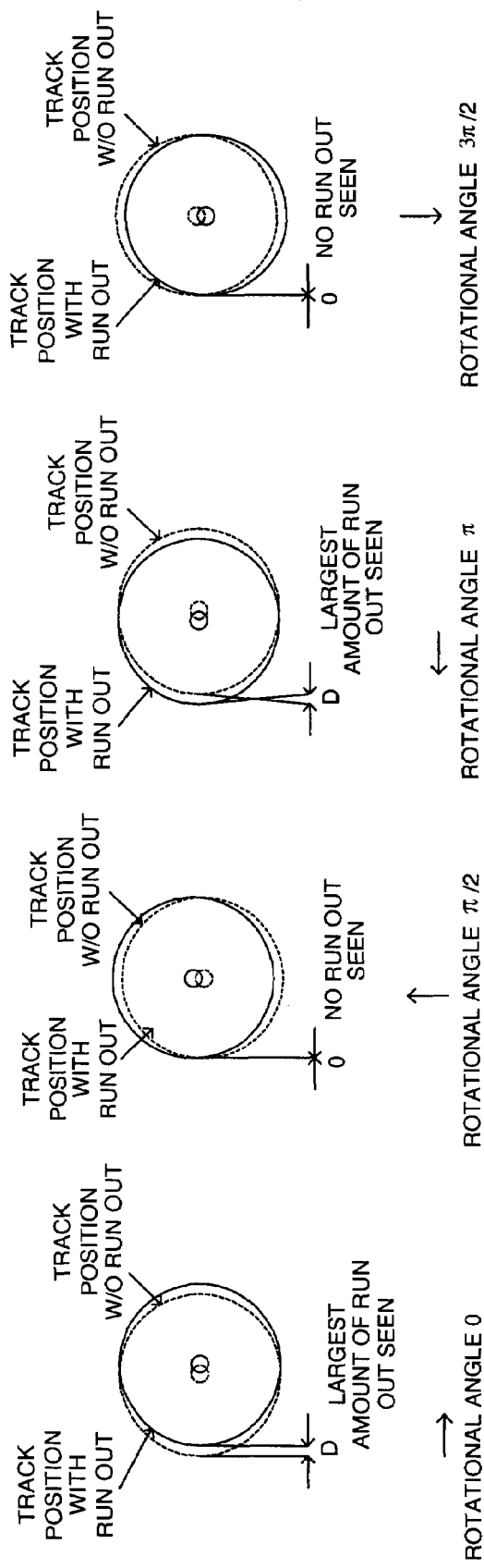
FIG. 3 (CONVENTIONAL)

DIFFERENTIAL PUSH-PULL GAIN CONTROLLING METHOD AND APPARATUS TO REDUCE THE EFFECTS OF ROTATIONAL ECCENTRICITY

FIELD OF THE INVENTION

The present invention relates to optical storage devices generally and, more particularly, to a method and/or apparatus for implementing a differential push pull gain to reduce the effects of rotational eccentricity.

BACKGROUND OF THE INVENTION

For recordable DVDs (i.e., DVD+R, etc.) a laser spot is positioned over the center of the track using a differential push-pull (DPP) signal. The signal DPP provides the relative position of the laser spot and the track center. A closed loop servo system uses the signal DPP to produce a control signal to hold the laser spot over the center of the track.

The tracks of a disc form a long spiral from the inner diameter (ID) to the outer diameter (OD) of the disc. As the disc rotates and the laser spot follows the spiral, the laser spot moves from the ID to the OD of the disc.

Referring to FIGS. 1-2; conceptual diagrams illustrating a main beam and side beam detection and position are shown. FIG. 1 illustrates a photo-diode system 10. The photo-diode system 10 includes a number of photo-diode arrays 12a-12n. The outputs of the photo-diode array 12a (when the laser beam is focused on the disc) are shown as signals E1 and E2, respectively. The outputs of the photo diode array 12b are shown as signals A, B, C and D, respectively. The outputs of the photo diode array 12n are shown as signals F1 and F2, respectively. The laser spot reflects off the disc and is imaged on the photo-diode array 10. The land-groove structure of the disc causes diffraction and the intensity between the signals A and D changes relative to the signals B and C when the laser spot moves away from a center of a track on a disc. The difference in intensity between the signals A and D due to this effect and the signals B and C of the photo detector array 12b is known as the push-pull effect.

A second effect arises when the laser does not shine through the center of the lens. In such a case, refraction through the lens causes an imaged spot on the photo detector array 12b to move to one side which leads to a changing of the relative intensity between the signals A and D versus the signal B and C. Such an effect is called the center error (or signal CE). Since it is difficult to distinguish the push-pull effect and center effects from a main beam (i.e., a signal MPP) alone, side beams (i.e., signals SPP1 and SPP2) are used. By weighting the signals SPP1 and SPP2 and subtracting the sum of the signal SPP1 and the signal SPP2 from the signal MPP, the push-pull effect and the relation position of the laser spot to the track center may be determined.

The signal MPP is defined as:

$$MPP=(A+D)-(B+C)=TE+CE \qquad \text{EQ. (1)}$$

where the signals A, B, C, and D are defined as the intensity on the photo diode array 12b. A tracking error signal (or signal TE) is the push-pull effect due to the placement of the laser spot relative to the center of track. The signal CE is the center error that arises from the lens/spot offset. The side beam push-pull signal (or signal SPP) is defined as the sum of the signal SPP1 and SPP2, where:

$$SPP1=E1-E2; \text{ and} \qquad \text{}$$

$$SPP2=F2-F1 \qquad \text{EQ. (2)}$$

where the signals E1, E2, F1, and F2 are the intensity on the photo diode array 10. The signal TE is the push-pull effect due to the placement of the laser spot relative to the center of a track or a disc track center. The sign is reversed since the signal TE is offset from the center of the track by ½ track. The signal CE is generated from the offset between the lens and laser spot. The laser spots of the signals SPP1 and SPP2 have a lower intensity than the intensity of the signal MPP. Such a lower intensity is reflected by a factor K. The signal DPP is defined by:

$$DPP=(MPP-K*SPP)=2*TE \qquad \text{EQ. (3)}$$

Therefore, the signal DPP does not include or depend on the signal CE.

For a given offset X, and a track pitch TP, the push-pull effect is approximately:

$$TE=\sin(2\pi(X/TP)) \qquad \text{EQ. (4)}$$

Referring to FIG. 3, a diagram illustrating a physical origin of run out on a disc is shown. The tracks on an optical disc form a long spiral. As the disc spins, the laser follows the spiral from the inner diameter (ID) to the outer diameter (OD). However, the center of the spiral is not the center of rotation of the spiral and miscentering occurs. As the disc rotates, the track moves radially relative to a fixed point (i.e., the uncontrolled laser spot). The miscentering occurs from (i) the placement of the center hole in the disc relative to track center and (ii) the placement of the motor spindle. To reduce the effect of errors by placing the laser spot on the track, a closed loop control system is used. While the closed loop control is operating, the lens will move radially with the disc so that the laser spot is held on the center of the track. Such radial motion is defined as run out. FIG. 3 illustrates various rotational angles of the disc while in the presence of run out. The rotational angle of the disc in the presence of run out is shown as 0, π/2, π and 3π/2.

Run out is proportional to center error. As the track moves radially, the lens moves radially so that the laser spot follows the center of track. The motion of the lens induces the signal CE that is synchronous to the disc rotation. The effect of the signal CE illustrates why the signal DPP is used instead of the signal MPP.

The push-pull component of the signal SPP depends on the signals SPP1 and SPP2 being exactly one half-track displaced from the signal MPP. If the signals SPP1, SPP2 and MPP become skewed relative to the track, the signal DPP will change. Such a skewing attenuates the signal SPP. The attenuation of the signal SPP further depends on the rotational angle of the disc. Therefore, as the disc rotates while in the presence of runout, the signal SPP is modulated. The attenuation of the signal SPP leads to an attenuation of the signal DPP since the signal DPP is a function of the signal MPP and SPP.

It would be desirable to implement a system that amplifies a differential push pull signal to mitigate the effects of attenuation by predicting an attenuation factor.

SUMMARY OF THE INVENTION

The present invention concerns an apparatus comprising a photo diode array, a differential push-pull generator circuit and an attenuation prediction circuit. The photo diode array may be configured to generate a plurality of beam signals. The differential push-pull generator circuit may be configured to generate a differential push-pull signal with one or more gain blocks in response to (i) a radius adjustment signal, (ii) a gain approximation signal and (iii) the plurality of beam signals. The attenuation prediction circuit may be configured to (i)

predict an attenuation factor of the differential push-pull signal and (ii) generate the gain approximation signal in response to (a) a plurality of amplification signals and (b) a plurality of angle signals.

The objects, features and advantages of the present invention include providing a method and/or apparatus for implementing a DPP gain that may (i) reduce the effects of rotational eccentricity, (ii) predict an attenuation factor, (iii) amplify a differential push-pull signal to mitigate the effects of disc eccentricity and/or (iv) be easy to implement.

BRIEF DESCRIPTION OF THE DRAWINGS

These and other objects, features and advantages of the present invention will be apparent from the following detailed description and the appended claims and drawings in which:

FIG. 1 is a diagram illustrating a main beam and side beam detection;

FIG. 2 is a diagram illustrating a main beam and a side beam position;

FIG. 3 is a diagram illustrating a physical origin of run out;

DETAILED DESCRIPTION OF THE PREFERRED EMBODIMENTS

Figure 4:
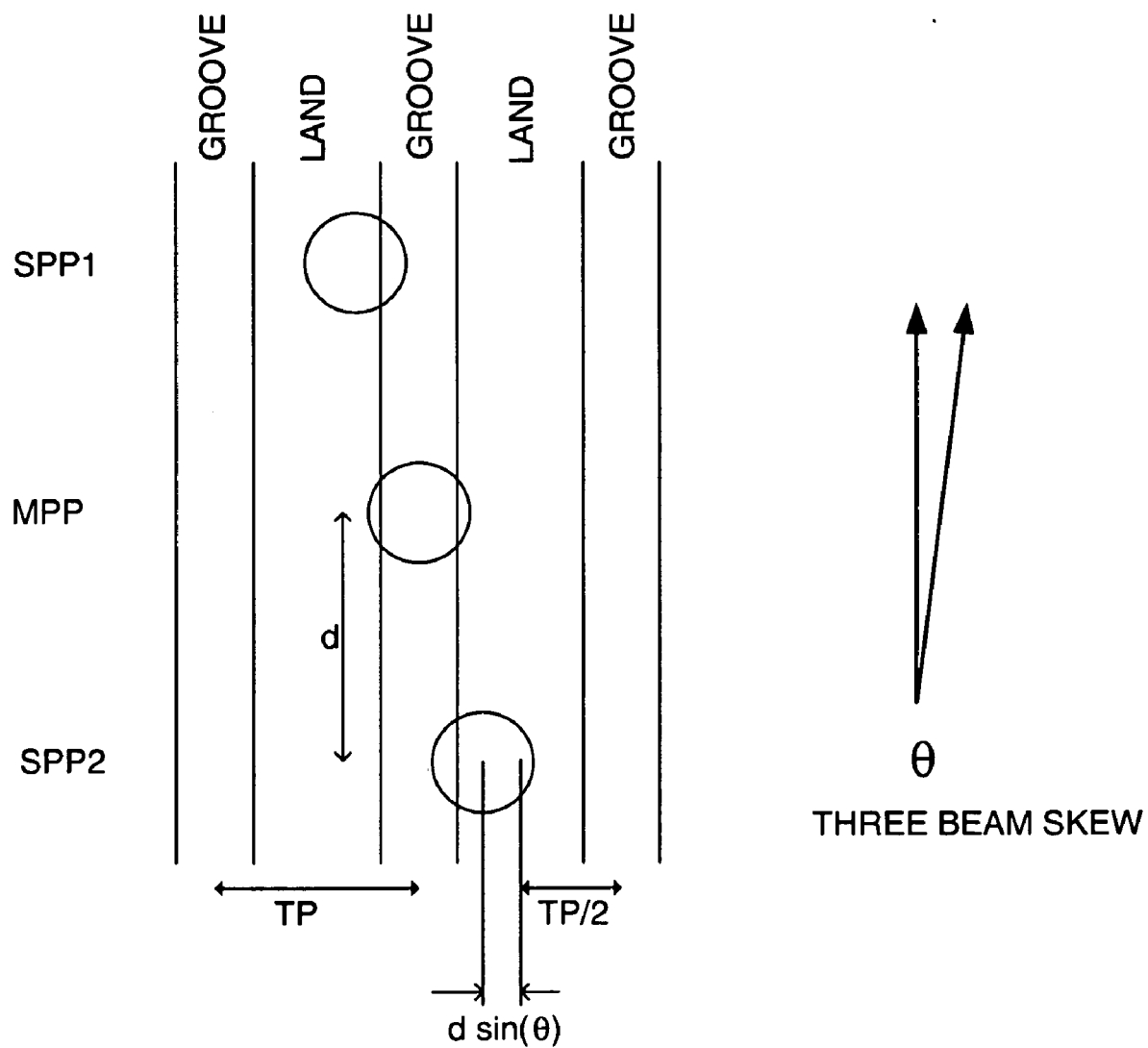
FIG. 4 is a diagram illustrating the main beam and the side beams having a three beam skew.

Referring to FIG. 4, a diagram illustrating a skew between a signal MPP (a main beam signal), a signal SPP1 (a side beam signal) and a signal SPP2 (a side beam signal) is shown. A push-pull component of the signal SPP depends on the signal SP1 and SP2 being one-half track displaced from the signal MPP. The signals SPP1, SPP2 and MPP may become skewed relative to the track of a disc. Such a skewing may change the push-pull component. The skew between the signals MPP, SPP1 and SPP2 may be defined as θ (e.g., a three beam skew angle). Due to the skew, the signals SPP1 and SPP2 are no longer a half track from the signal MPP. The signals SPP1 and SPP2 may be off by $d^*\sin(\theta)$. The distance d, may be defined as the tangential distance between the signal MPP and the signal SPP1 or SPP2. For a given track location X, and ignoring the signal CE, the signal SPP may be defined as:

$$SPP = \sin(2\pi(X+d^*\sin(\theta))/TP) + \sin(2\pi(X-d^*\sin(\theta))/TP) = \sin(2\pi(X/TP)\cos(2\pi d^*\sin(\theta)/TP) \quad \text{EQ. (5)}$$

The attenuation factor of the signal SPP may be defined as $A_s(\theta) = \cos(2\pi d^*\sin(\theta)/TP)$ due to the skew angle θ. The skew angle θ depends on the rotational angle of the disc. As the disc rotates, the signal SPP and hence the signal DPP will be modulated.

Figure 5:
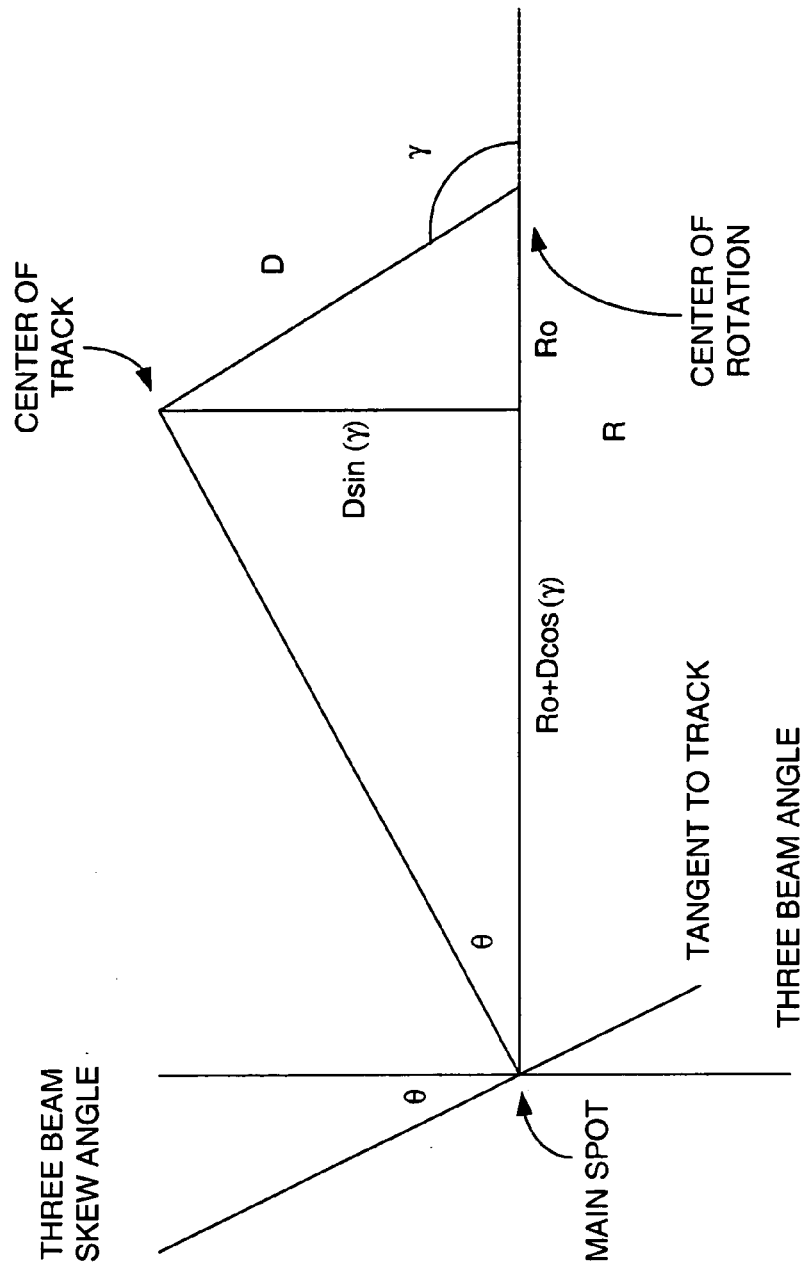
FIG. 5 is a diagram illustrating the determination of the three beam skew between the main beam and the side beams.

Referring to FIG. 5, a diagram illustrating a three beam skew angle is shown. The attenuation factor of the side beam $A_s(\theta)$ is related to the rotational angle γ of the disc. The rotational angle γ varies from 0 to π/2 as the disc rotates one revolution. The skew angle θ may be found from the ratio of the two sides of the triangle as defined by:

$$\theta(\gamma) = \sin^{-1}((D^*\sin(\gamma))/(R_0 + D^*\cos(\gamma))) + \theta_0 \quad \text{EQ. (6)}$$

EQ. (6) is generally a function of the rotational angle γ. D is the displacement between the center of the track and the center of rotation. The displacement between the center of the track and the center of rotation is due to disc eccentricity and mechanical features (e.g., tolerance of the spindle motor center). The initial skew angle $\theta_0$ may be defined as initial skew between the signal MPP and the signals SPP1 and SPP2. The initial radius $R_0$ may be defined as the intersection between the center of the track and the distance between main spot and the center of rotation.

Figure 6:
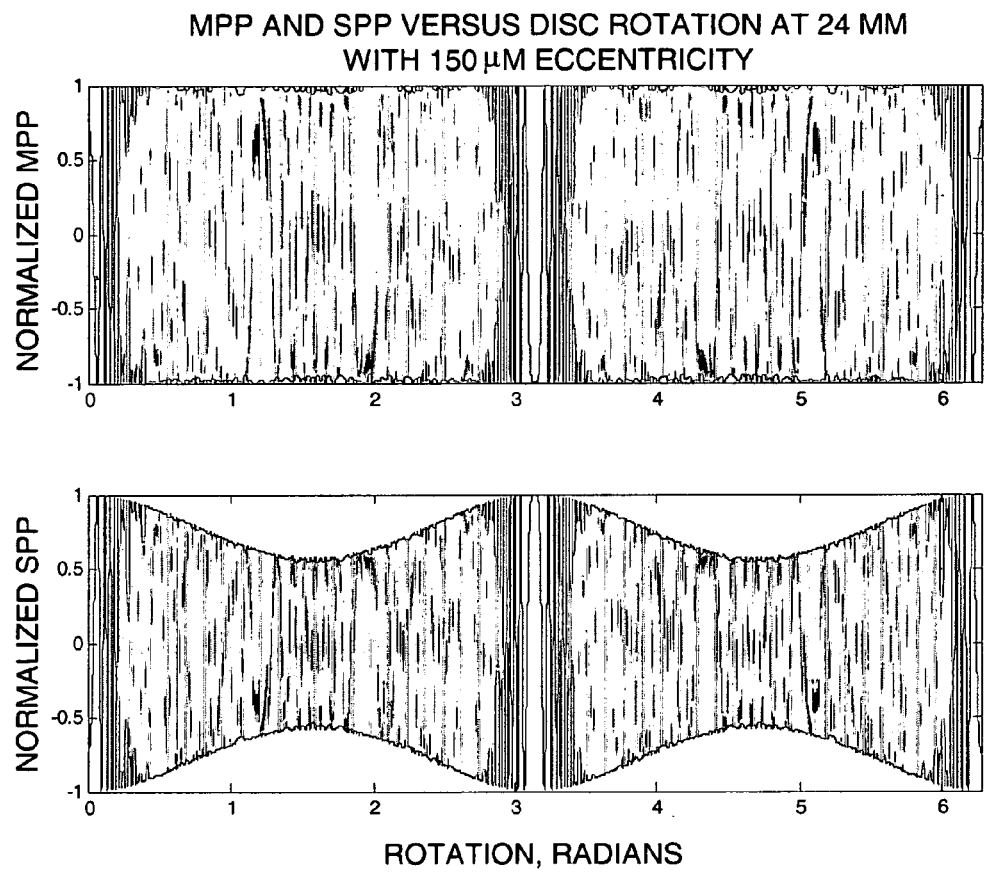
FIG. 6 is a diagram of a signal MPP and a signal SPP versus disc rotation at a specified disc eccentricity and radius.

Referring to FIG. 6, a diagram illustrating the signal MPP and the signal SPP is shown. If the laser spot is fixed and not following a track and the disc is spinning, run out will carry many tracks under the laser spot. The eccentricity D is normally 150 um, and $R_0$ is normally 24 mm. The initial skew angle may be 0. At the rotational angle of the disc at 0 and π, the radial motion of the disc relative to the laser spot is the slowest. Therefore, the signal SPP appears as a low frequency sine wave. At other angles, a relative radial velocity is proportional to the sine of the rotational angle. In addition, the envelope of the signal SPP is modulated by an attenuation factor of the side beam, $A_s(\theta)$.

Figure 7:
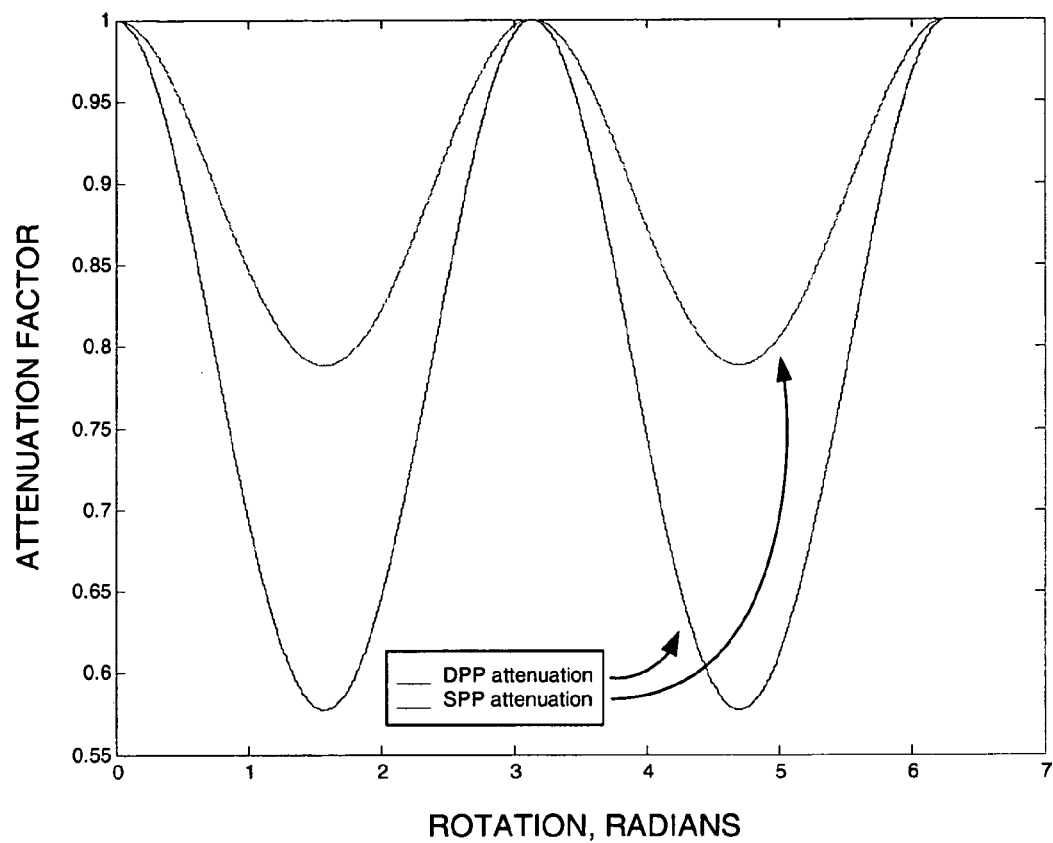
FIG. 7 is a diagram illustrating an attenuation factor for the signal DPP and the signal SPP with a zero initial skew.
Figure 8:
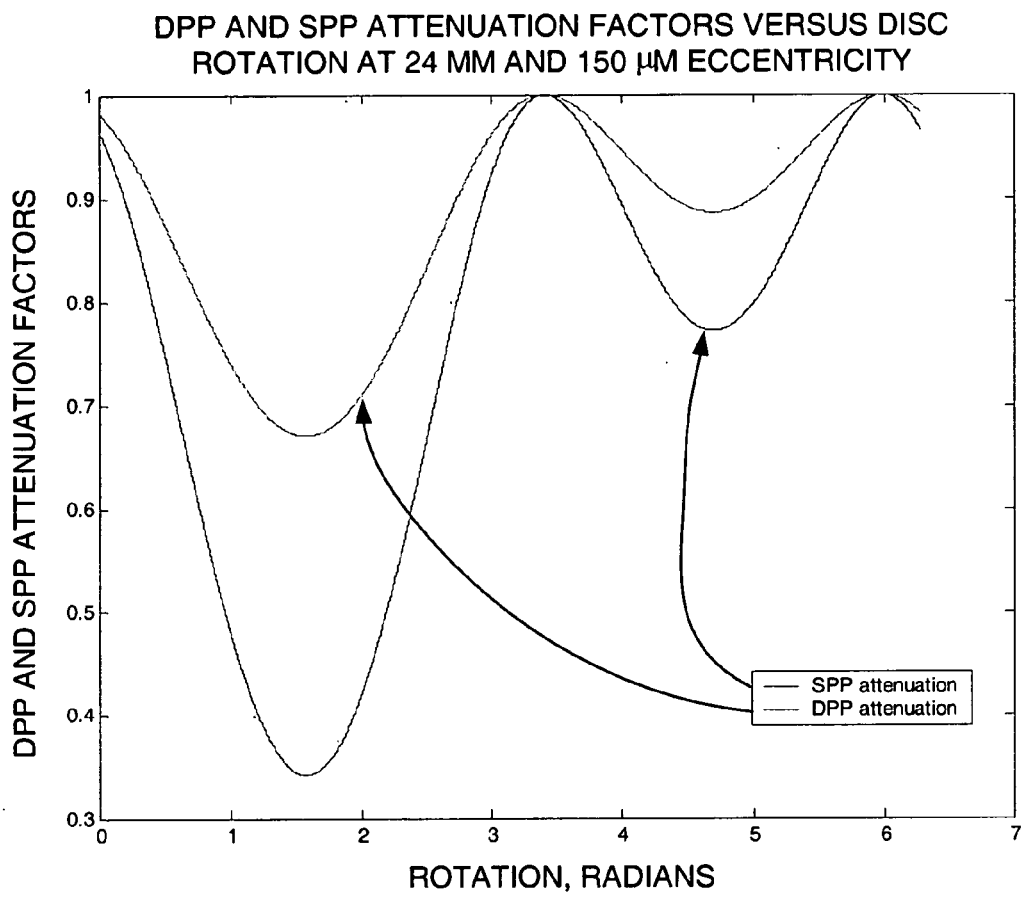
FIG. 8 is a diagram illustrating an attenuation factor for the signal DPP and the signal SPP with a non-zero initial skew.

FIG. 7 illustrates an attenuation factor with an initial skew of 0 for the signal MPP and the signal SPP. The signal DPP incorporates the signals SPP and MPP. Therefore, the attenuation for the signal DPP is smaller than the signal SPP. The attenuation for the signal DPP may be $A_d(\theta) = (1+A_s(\theta))/2$. The desired gain signal (or signal GA) may be $GA = 1/A_d(\theta)$. FIG. 8 illustrates an attenuation factor with a non-zero initial skew for the signal MPP and the signal SPP (e.g., $\theta_0 \neq 0$). FIG. 8. illustrates when the initial skew angle comprises non-zero values, the result is similar. However, the result is asymmetric with one half of the revolution being less attenuated and the other half of the revolution being more attenuated.

Figure 9:
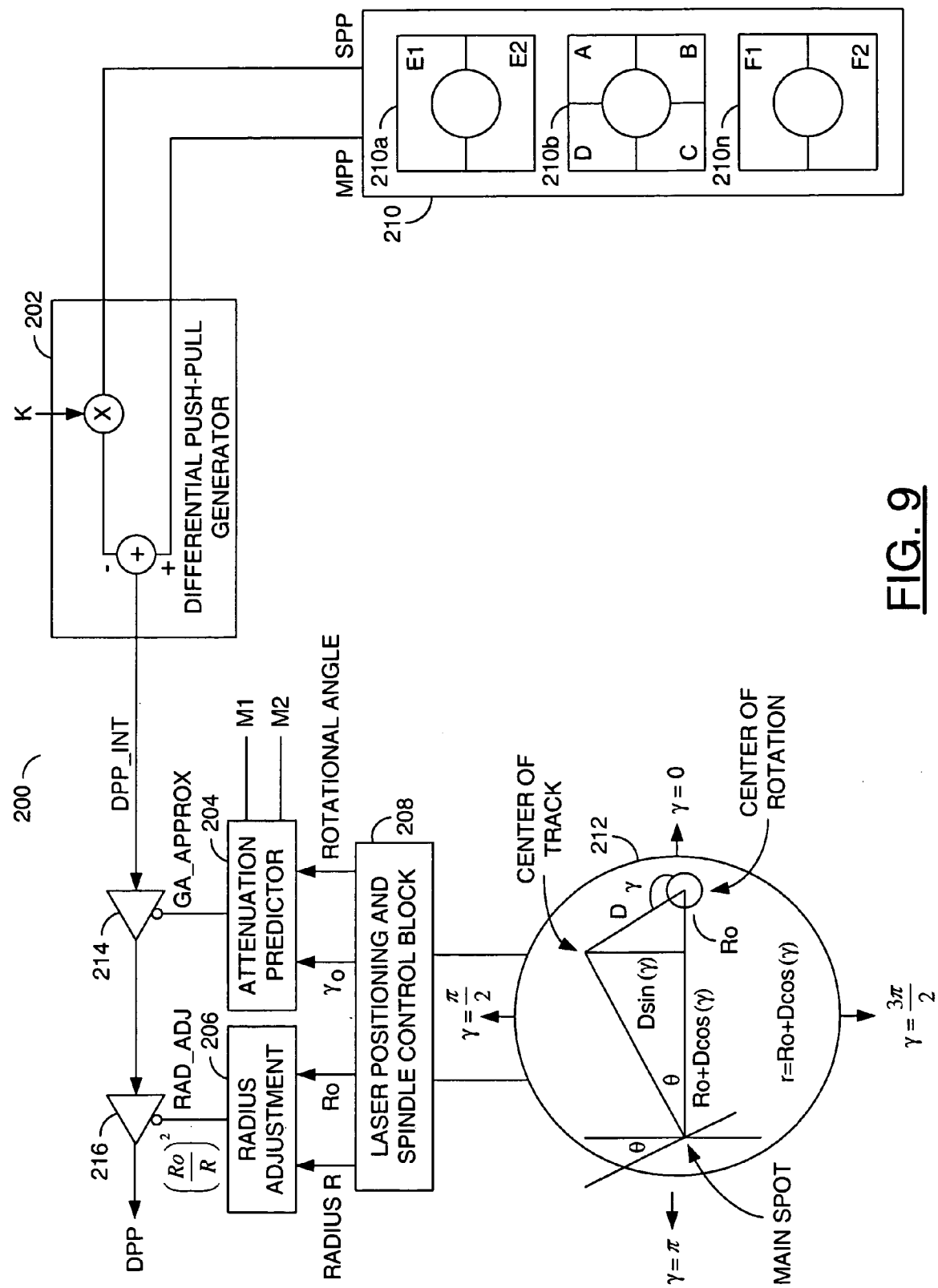
FIG. 9 is a block diagram of a system in accordance with the present invention.

Referring to FIG. 9, a diagram of a system 200 is shown. The system 200 generally comprises a block (or circuit) 202, a block (or circuit) 204, a block (or circuit) 206, a block (or circuit) 208, a block (or circuit) 210, a disc 212, a block (or circuit) 214, and a block (or circuit) 216. The circuit 202 may be a differential push-pull generator circuit. The circuit 204 may be an attenuation predictor circuit. The circuit 206 may be a radius adjustment circuit. The circuit 208 may be implemented as a laser positioning and spindle control block circuit. The circuit 208 may generate an initial radius signal (e.g., $R_0$), a signal (e.g., RADIUS) which corresponds to r, a signal (e.g., ROTATIONAL_ANGLE) which corresponds to γ and an initial rotational angle signal (e.g., $\gamma_0$). The circuit 210 may be implemented as a photo diode system. The circuits 214 and 216 may be implemented as gain blocks. The circuit 204 may present an approximate gain signal (e.g., GA_APPROX) in response to an amplification signal (e.g., M1), an amplification signal (e.g., M2) and the signals ROTATIONAL_ANGLE and $\gamma_0$. The signal GA_APPROX may be defined as an approximation of the desired gain signal GA.

The signal GA_APPROX may be received by the gain block 214. The circuit 206 may divide the signal $R_0$ by the signal R and square the result to generate a signal (e.g., RAD_ADJ). The signal RAD_ADJ may be received by the gain block 216. The circuit 202 may generate a signal (e.g., DPP_INT) in response to a factor signal (e.g., K), a signal (e.g., MPP) and a signal (e.g., SPP). The signal DPP_INT may be an intermediate differential push-pull signal which includes the attenuation $A_d(\theta)$. The gain block 216 may generate the signal DPP. The signal DPP may be substantially equal to EQ. (3). The signal DPP may have a substantial portion of the attenuation $A_d(\theta)$ removed. The circuit 206 may be implemented as a number of photo diode arrays 210a-210n. The photo diode array 210a may generate the signals E1 and E2. The photo diode array 210b may generate the signals A, B, C and D. The photo diode array 210n may generate the signals F1 and F2.

If the parameters of the signal GA_APPROX are known, it may be possible to predict the attenuation of the signal DPP. The system 100 may divide the attenuation to obtain the correct signal DPP. The signal GA_APPROX (or the corrective gain) may be a function of the signals ROTATIONAL_ANGLE and RADIUS and other factors that are fixed for the particular drive.

In general, due to gain tolerances in the servo system, it is not necessary to be completely accurate in solving the signal GA_APPROX. For example, a piecewise linear approximation of the signal GA_APPROX may be parameterized as follows:
 (i) The turn around point of the disc rotation, or zero angle ($\gamma=0$)
 (ii) The necessary amplification, $m_1$, (or the signal M1) at $\gamma=\pi/2$, and known radius $R_0$; and
 (iii) The necessary amplification, $m_2$ (or the signal M2) at $\gamma=3\pi/2$, and known radius $R_0$.

At the rotational angle $\gamma$, the value of the signal GA_APPROX may be defined by the following equations:

$$G_a(\gamma) = \begin{cases} \frac{\gamma}{\pi/2} \cdot m_1 & 0 \leq \gamma \leq \pi/2 \\ \left(1 - \frac{\gamma - \pi/2}{\pi/2}\right) \cdot m_1 & \pi/2 \leq \gamma \leq \pi \\ \frac{\gamma - \pi}{\pi/2} \cdot m_2 & \pi \leq \gamma \leq 3\pi/2 \\ \left(1 - \frac{\gamma - 3\pi/2}{\pi/2}\right) \cdot m_2 & 3\pi/2 \leq \gamma \leq 2\pi \end{cases} \quad \text{EQ. (7)}$$

where $G_a(\gamma)$ is defined as the signal GA_APPROX.

The signal DPP may be given by the following equation:

$$DPP = (1 + (RO/R)^2 * GA(\gamma) * (MPP - K*SPP)) \quad \text{EQ. (8)}$$

Figure 10:
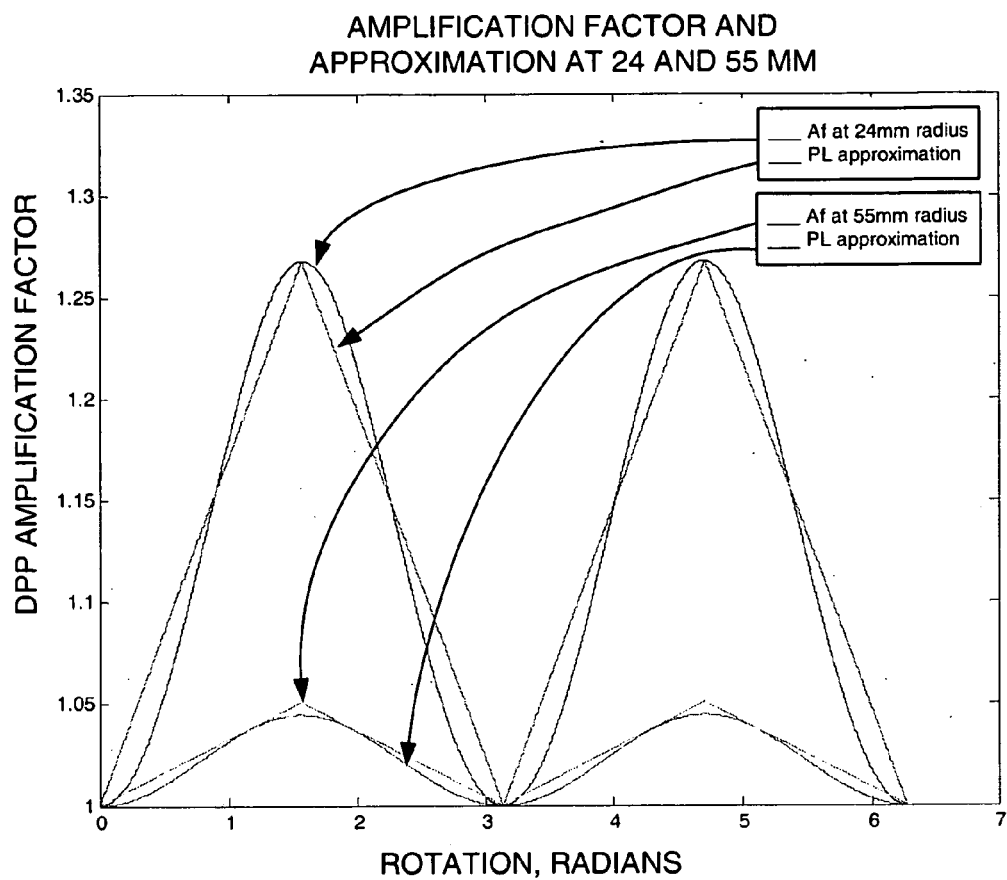
FIG. 10 is a diagram illustrating the amplification factor to piecewise linear (PL) approximation for DPP gain correction.
Figure 11:
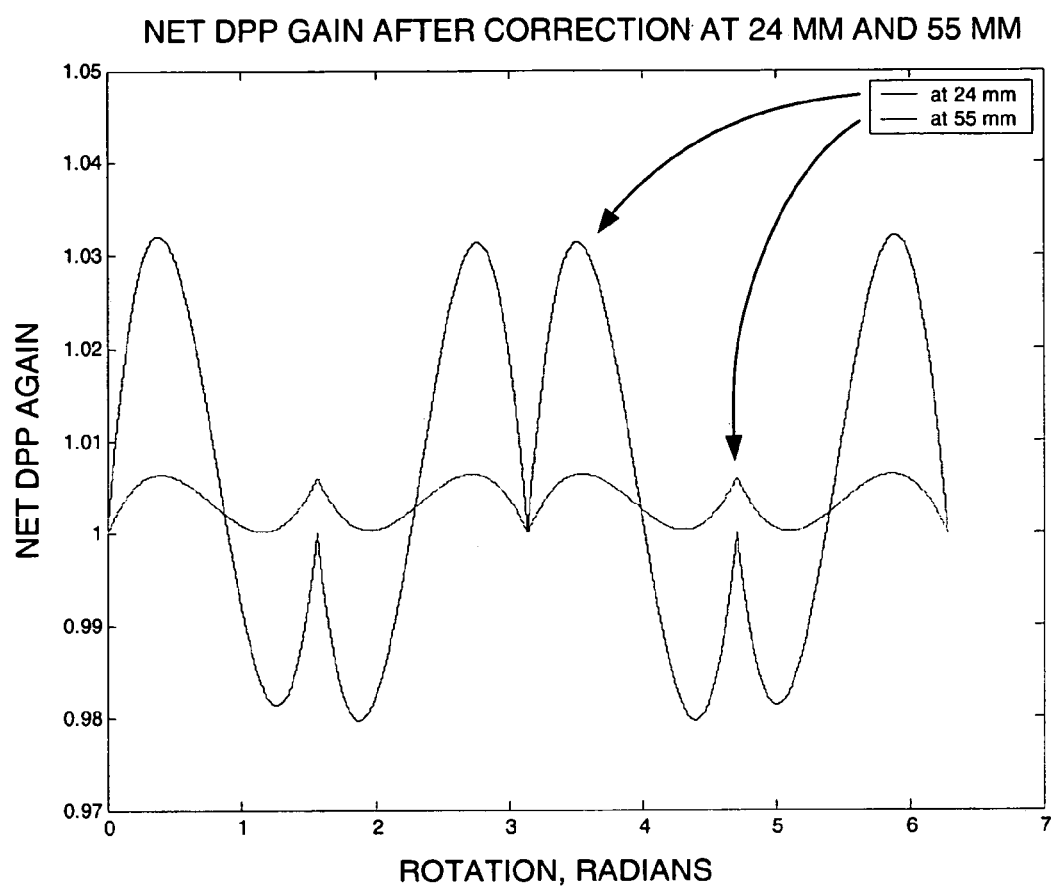
FIG. 11 is a diagram illustrating a signal DPP gain after correction.

The attenuation predictor 204 may generate the signal GA_APPROX as defined by EQ. (7) based on the values of the signals M1, M2, the signal ROTATIONAL_ANGLE and the initial rotational angle. The value of the signal ROTATIONAL_ANGLE may vary between 0 and $2\pi$. The generation of the amplitude signals M1 and M2 will be discussed in more detail in connection with FIG. 11. The signal RAD_ADJ (or $(RO/R)^2$) may be multiplied to the output of the gain block 214. As the signal Ro and the signal R increases, a larger gain is needed to adjust for the radius (or signal R). If the signal ROTATIONAL_ANGLE, and the amplification signals M1 and M2 are known, the attenuation predictor 204 may generate the signal GA_APPROX. The system 200 may use the signal GA_APPROX to mitigate the effects of the attenuation factor to generate the signal DPP. FIGS. 10-11 illustrate the effects of the corrective action when the signal DPP is amplified by the signal GA. FIG. 10 illustrates the signal DPP amplification function and approximation. FIG. 11 illustrates the net signal DPP gain after correction.

Figure 12:
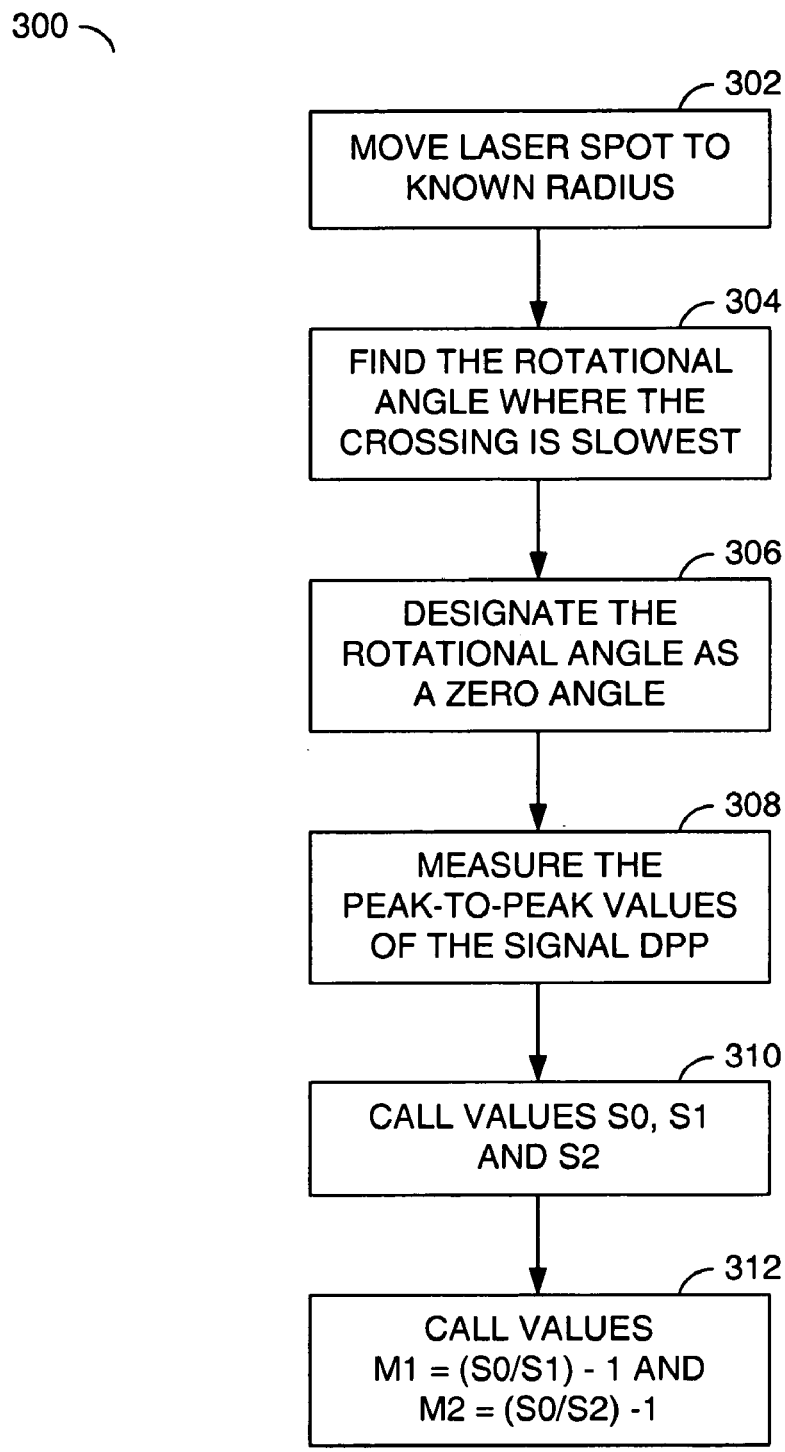
FIG. 12 is a diagram illustrating a flow diagram of a calibration process.

Referring to FIG. 12, a method 300 for calibrating the signal GA is shown. The method 300 generally comprises a state 302, a state 304, a state 306, a state 308, a state 310, and a state 312. The state 302 may move the laser spot to a known radius. The state 304 may find the rotational angle where the crossing is the slowest. The state 306 may designate the rotational angle where the crossing is the slowest as a zero angle. The rotational angle where the crossing is the slowest may be determined by keeping track of the pulses from the spindle motor. The state 308 may measure the peak-to-peak value of the signal DPP at (i) the zero angle, (ii) ¼ revolutions after the zero angle, and (iii) ¾ revolutions after the zero angle. The state 310 may designate the values S0, S1 and S2 to the measured park-to-peak values of the signal DPP. The value S0 may be set to the measured peak-to-peak value of the signal DPP at the zero angle. The value S1 may be set to the measured peak-to-peak value of the signal at a quarter revolution after the zero angle. The value S2 may be set to the measured peak-to-peak value of the signal DPP at three quarters of a revolution after the zero angle. The state 312 may set the signal M1=(S0/S1)−1 and the signal M2=(S0/S2)−1. In a typical drive system, the starting radius is known. After power up, the sled is moved toward the inner diameter, where the sled trips a limit switch at a known radius. After detecting the known radius, the sled moves toward the inner diameter by a fixed and known amount. The sled motor is typically implemented as a stepper motor. The motion to the outer diameter is a fixed number of steps. Since the step size is precisely known, the starting radius may be accurately controlled. In general, the spindle controller knows the motor angle. When the disc is put on, the "zero angle" (angle where runout is slowest) may be any value. The "rotational angle" in FIG. 9 is. the motor angle. The calibration step determines the zero angle. The zero angle will not change until the disc stops spinning. The next time the disc spins up, the zero angle is normally recalculated.

There are many alternative ways to approximate the amplification function and to estimate the necessary parameters. One alternative is to approximate the amplification function as a sum of sinusoids at a fundamental and second harmonic of the rotation angle of the disc. Various methods to parameterize the approximation function may be used. For example, such methods may include (i) taking the root means square (RMS) over various regions, (ii) estimating the peak-peak values and (iii) integrating the product of the signal SPP and the signal MPP at different times. Disc eccentricity and other factors can cause the signal DPP to be attenuated. The present invention may amplify the signal DPP as a function of disc rotation angle and radius to mitigate such an attenuation.

The function performed by the flow diagram of FIG. 12 may be implemented using a conventional general purpose digital computer programmed according. to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMS, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   a photo diode array configured to generate a plurality-of beam signals;
   a differential push-pull generator circuit configured to generate a differential push-pull signal with one or more gain blocks in response to (i) a radius adjustment signal, (ii) a gain approximation signal, and (iii) said plurality of beam signals; and
   an attenuation prediction circuit configured to (i) predict an attenuation factor of said differential push-pull signal and (ii) generate said gain approximation signal in response to (a) a plurality of amplification signals and (b) a plurality of angle signals, wherein said gain approximation signal is generated to compensate for the predicted attenuation factor of said differential push-pull signal.

2. The apparatus according to claim 1, wherein said radius adjustment signal comprises:
   an initial radius signal configured to indicate a distance between where a certain of a track on a disc intersects with a point between a center of rotation on said disc and a main spot of a laser; and
   a radius signal configured to indicate a distance between said center of rotation of said disc and said main spot on said disc.

3. The apparatus according to claim 1, wherein said plurality of beam signals comprises a main beam signal and one or more side beam signals.

4. The apparatus according to claim 1, wherein said angle signals comprises an initial rotational angle signal and a rotational angle signal wherein said rotational angle signal varies between zero and three hundred and sixty degrees.

5. The apparatus according to claim 1, wherein said plurality of amplification signals comprises measured peak-to-peak values of said differential push-pull signal when a disc is at any one of a zero angle, one quarter of a revolution after said zero angle, three quarters of a revolution after said zero angle.

6. The apparatus according to claim 1, wherein said differential push-pull generator is configured to generate an intermediate differential push-pull signal in response to a factor signal and said beam signals.

7. An apparatus comprising:
   means for generating a plurality of beam signals;
   means for generating a differential push-pull signal with one or more gain blocks in response to (i) a radius adjustment signal, (ii) a gain approximation signal, and (iii) said plurality of beam signals; and
   means for (i) predicting-an attenuation factor of said differential push-pull signal and (ii) generating said gain approximation signal in response to (a) a plurality of amplification signals and (b) a plurality of angle signals, wherein said gain approximation signal is generated to compensate for the predicted attenuation factor of said differential push-pull signal.

8. A method for generating a gain of a differential push-pull signal comprising the steps of:
   (A) generating a plurality of beam signals;
   (B) generating a differential push-pull signal with one or more gain blocks in response to (i) a radius adjustment signal, (ii) a gain approximation signal, and (iii) said plurality of beam signals;
   (C) predicting an attenuation factor of said differential push-pull signal; and
   (D) generating said gain approximation signal in response to (a) a plurality of amplification signals and (b) a plurality of angle signals, wherein said gain approximation signal is generated to compensate for the predicted attenuation factor of said differential push-pull signal.

9. The method according to claim 8, wherein step (B) further comprises the step of:
   determining a distance between where a center of a track on a disc intersects with a point between a center of rotation on said disc and a main spot of a laser.

10. The method according to claim 9, further comprising the step of:
    determining a distance between said center of rotation of said disc and said main spot on said disc.

11. The method according to claim 8, further comprising the step of:
    determining parameters for said gain approximation signal during calibration.

12. The method according to claim 11, further comprising the step of:
    examining a time of track crossing.

13. The method according to claim 12, further comprising the step of:
    determining a rotational angle signal where the track crossing is slowest.

14. The method according to claim 13, further comprising the step of:
    designating said rotational angle signal as the zero crossing.

15. The method according to claim 14, further comprising the step of:
    measuring a peak-to-peak value of said differential push-pull signal.

16. The method according to claim 14, further comprising the step of:
    measuring a peak.-to-peak value of said differential push-pull signal at (i) a zero angle, (ii) one-quarter of a revolution after said zero angle, and (iii) three quarters of a revolution after said zero angle.

17. The method according to claim 16, further comprising the step of:
    setting said peak-to-peak value of said differential push-pull signal to a first value when a disc is at said zero angle.

18. The method according to claim 17, further comprising the step of:
    setting said peak-to-peak value of said differential push-pull signal to a second value when said disc is at said one-quarter a revolution after said zero angle.

19. The method according to claim 18, further comprising the step of:
    setting said peak-to-peak value of said differential push-pull signal to a third value when said disc is at three-quarters of a revolution after said zero angle.

20. The method according to claim 19, further comprising the step of:
    determining a first of said plurality of amplification signals with said first and second value; and
    determining a second of said plurality of amplification signals with said first value and said third value.

* * * * *